US012293593B2

(12) United States Patent
Xu

(10) Patent No.: US 12,293,593 B2
(45) Date of Patent: May 6, 2025

(54) OBJECT DETECTION METHOD, OBJECT DETECTION DEVICE, TERMINAL DEVICE, AND MEDIUM

(71) Applicant: GUANGDONG OPPO MOBILE TELECOMMUNICATIONS CORP., LTD., Dongguan (CN)

(72) Inventor: Yi Xu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 442 days.

(21) Appl. No.: 17/836,926

(22) Filed: Jun. 9, 2022

(65) Prior Publication Data
US 2022/0301176 A1 Sep. 22, 2022

Related U.S. Application Data

(63) Continuation of application No. PCT/CN2020/114062, filed on Sep. 8, 2020.
(Continued)

(51) Int. Cl.
G06V 20/00 (2022.01)
G06T 7/11 (2017.01)
(Continued)

(52) U.S. Cl.
CPC ............ G06V 20/647 (2022.01); G06T 7/11 (2017.01); G06T 7/187 (2017.01); G06V 10/26 (2022.01);
(Continued)

(58) Field of Classification Search
CPC ...... G06V 20/647; G06V 10/26; G06V 10/42; G06V 10/806; G06T 7/11; G06T 7/187; G06T 2207/10028
See application file for complete search history.

(56) References Cited

U.S. PATENT DOCUMENTS

2015/0254499 A1 9/2015 Pang et al.
2016/0342861 A1 11/2016 Tuzel et al.
2019/0091565 A1 3/2019 Nelson et al.

FOREIGN PATENT DOCUMENTS

CN 106529573 A 3/2017
CN 107291093 A 10/2017
(Continued)

OTHER PUBLICATIONS

Hu et al, A combined clustering and image mapping based point cloud segmentation for 3D object detection, Chinese Control and Decision Conference(CCDC), IEEE, Jun. 9, pp. 1664-1669 (Year: 2018).*
(Continued)

Primary Examiner — Xiao Liu
(74) Attorney, Agent, or Firm — Sheppard, Mullin, Richter & Hampton LLP

(57) ABSTRACT

An object detection method is provided. The method includes: acquiring a scene image of a scene; acquiring a three-dimensional point cloud corresponding to the scene; segmenting the scene image into a plurality of sub-regions; merging the plurality of sub-regions according to the three-dimensional point cloud to generate a plurality of region proposals; and performing object detection on the plurality of region proposals to determine a target object to be detected in the scene image. In addition, an object detection device, a terminal device, and a medium are also provided.

17 Claims, 4 Drawing Sheets

Related U.S. Application Data

(60) Provisional application No. 62/947,372, filed on Dec. 12, 2019.

(51) Int. Cl.
  *G06T 7/187* (2017.01)
  *G06V 10/26* (2022.01)
  *G06V 10/42* (2022.01)
  *G06V 10/80* (2022.01)
  *G06V 20/64* (2022.01)

(52) U.S. Cl.
  CPC ............ *G06V 10/42* (2022.01); *G06V 10/806* (2022.01); *G06T 2207/10028* (2013.01)

(56) References Cited

FOREIGN PATENT DOCUMENTS

| CN | 109272577 A |   | 1/2019 |
|----|-------------|---|--------|
| CN | 109446984 A | * | 3/2019 |
| CN | 109816664 A |   | 5/2019 |

OTHER PUBLICATIONS

Kanezaki et al, 3D Selective Search for obtaining object candidates, IEEE/ RSJ International Conference on Intelligent Robots and Systems(IROS), IEEE, Sep. 28, pp. 82-87 (Year: 2015).*

Bai et al, "Region-proposal Convolutional Network-driven Point Cloud Voxelization and Over-segmentation for 3DObject Detection" , Chinese Control and Decision Conference(CCDC), IEEE, pp. 3553-3558, Jun. 3 (Year: 2019).*

Uijings et al, Selective Search for Object Recognition, Int J Comput Vis., vol. 104, pp. 154-171 (Year: 2013).*

International Search Report and Written Opinion dated Dec. 9, 2020 in International Application No. PCT/CN2020/114062.

Ke, Xiang et al. "Real-Time Object Recognition System for Indoor Service Robot", Computer Systems & Applications, vol. 22, No. 10, Oct. 31, 2013 (Oct. 31, 2013), the whole document.

Hu, Fangchao et al. "A Combined Clustering and Image Mapping based Point Cloud Segmentation for 3D Object Detection", IEEE, Jul. 9, 2018 (Jul. 9, 2018), see sections 2-3.

Dry goods _ Introduction to target detection, reading this is enough (completed)—Programmer Sought; https://zhuanlan.zhihu.com/p/34142321.

A Survey of Object Detection Algorithms Based on Deep Learning; https://zhuanlan.zhihu.com/p/33981103.

Ross Girshick et al. "Rich feature hierarchies for accurate object detection and semantic segmentation", 2014 IEEE Conference on Computer Vision and Pattern Recognition.

"Fast R-CNN", Ross Girshick Microsoft Research, 2015.

Uijlings et al. "Selective Search for Object Recognition", http://vision.stanford.edu/teaching/cs231b_spring1415/slides/ssearch_schuyler.pdf.

Shaoqing Ren et al. "Faster R-CNN: Towards Real Time Object Detection with Region Proposal Networks", 2016.

Joseph Redmon et al. "You Only Look Once: Unified, Real-Time Object Detection", 2015.

Wei Liu et al. "SSD: Single Shot Multibox Detector", 2015.

Extended European Search Report dated Jan. 17, 2023 received in European Patent Application No. EP20899049.9.

Kanezaki et al:"3D Selective Search for obtaining object candidates" , 2015IEEE/ RSJ International Conference on Intelligent Robots and Systems(IROS), IEEE, Sep. 28, 2015(Sep. 28, 2015), pp. 82-88, XP032831579.

Bai et al, "Region—proposal Convolutional Network-driven Point Cloud Voxelization and Over-segmentation for 3DObject Detection", 2019 Chinese Control and Decision Conference(CCDC), IEEE, Jun. 3, 2019 (Jun. 3, 2019), pp. 3553-3558, XP033614653.

Hu et al, "A combined clustering and image mapping based point cloud segmentation for 3D object detection", 2018 Chinese Control and Decision Conference(CCDC), IEEE, Jun. 9, 2018 (Jun. 9, 2018), pp. 1664-1669, XP033370484.

Dou et al, "SEG-VoxelNet for 3D Vehicle Detection from RGB and LiDAR Data," 2019 International Conference on Robotics and Automation(ICRA), IEEE, May 20, 2019 (May 20, 2019), pp. 4362-4368, XP033593463.

Deng et al:"Unsupervised object region proposalsfor RGB-D indoor scenes" , Computer Vision and Image Understanding ,Academic Press ,US, vol. 154 (2017) , pp. 127-136, XP029831512,.

Gupta et al, "Learning Rich Features from RGB-D Images for Object Detection and Segmentation," SAT 2015 18th International Conference, Austin, TX, USA, Sep. 24-27, 2015, Jan. 1, 2014(Jan. 1, 2014), Springer, Berlin, Heidelberg 032548, XP055445798.

Communication pursuant to Article 94(3) EPC for European application 20899049.9 mailed Sep. 13, 2024.

The First Office Action from corresponding Chinese Application No. 202080084709.8 dated Sep. 15, 2024.

Kanezaki et al., "3D Selective Search for Obtaining Object Candidates", 2015 IEEE/RSJ International Conference on Intelligent Robots and Systems (IROS), Oct. 2, 2015.

Hu et al., "A Combined Clustering and Image Mapping based Point Cloud Segmentation for 3D Object Detection", IEEE, Jul. 9, 2018.

* cited by examiner

OBJECT DETECTION METHOD, OBJECT DETECTION DEVICE, TERMINAL DEVICE, AND MEDIUM

CROSS-REFERENCE TO RELATED APPLICATIONS

This application is a continuation of International Application No. PCT/CN2020/114062, filed on Sep. 8, 2020, which claims priority to and benefits of U.S. Patent Application Ser. No. 62/947,372, filed with the United States Patent and Trademark Office on Dec. 12, 2019, the entire contents of which are incorporated herein by reference.

FIELD

The present disclosure relates to the field of image recognition technologies, and more particularly, to an object detection method, an object detection device, a terminal device, and a medium.

BACKGROUND

Objects such as faces or cars in images can be detected through object detection, which is widely used in the field of image recognition technologies.

Currently, a mainstream object detection method includes two stages. The first stage is to extract a number of regions (i.e., region proposals) that may include objects based on an image by using a region proposal generation method. The second stage is to perform feature extraction on the extracted region proposals, and then identify categories of the objects in the region proposals by a classifier.

In the related art, during object detection, methods such as selective search and deep learning, are usually adopted in the first stage to generate region proposals, which may generate unreasonable redundant region proposals. Therefore, it is easy to cause waste of computing resources and computing time due to redundant region proposals during subsequent feature extraction and the like on the region proposals.

SUMMARY

Embodiments of the present disclosure provide an object detection method, an object detection device, a terminal device, and a computer readable storage medium, for the purpose of solving the following technical problems in the related art. The object detection method in the related art may generate some unreasonable redundant region proposals, which may result in waste of computing resources and computing time during subsequent feature extraction and the like on the region proposals.

For this, embodiments of a first aspect provide an object detection method. The method includes: acquiring a scene image of a scene; acquiring a three-dimensional point cloud corresponding to the scene; segmenting the scene image into a plurality of sub-regions; merging the plurality of sub-regions according to the three-dimensional point cloud to generate a plurality of region proposals; and performing object detection on the plurality of region proposals to determine a target object to be detected in the scene image.

Embodiments of a second aspect provide an object detection device. The device includes: a first acquiring module, configured to acquire a scene image of a scene; a second acquiring module, configured to acquire a three-dimensional point cloud corresponding to the scene; a segmenting module, configured to segment the scene image into a plurality of sub-regions; a merging module, configured to merge the plurality of sub-regions according to the three-dimensional point cloud to generate a plurality of region proposals; and a detecting module, configured to perform object detection on the plurality of region proposals to determine a target object to be detected in the scene image.

Embodiments of a third aspect provide a terminal device, including: a memory, a processor, and computer programs stored in the memory and executable by the processor. When the processor executes the computer programs, the object detection method according to embodiments of the first aspect is implemented.

Embodiments of a fourth aspect provide a computer readable storage medium, storing computer programs therein. When the computer programs are executed by a processor, the object detection method according to embodiments of the first aspect is implemented.

The technical solution disclosed in the present disclosure has the following beneficial effects.

With the object detection method according to embodiments of the present disclosure, after segmenting the scene image into the plurality of sub-regions, the plurality of sub-regions are merged according to the three-dimensional point cloud corresponding to the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

BRIEF DESCRIPTION OF DRAWINGS

The above and/or additional aspects and advantages of embodiments of the present disclosure will become apparent and more readily appreciated from the following descriptions made with reference to the drawings, in which.

DESCRIPTION OF EMBODIMENTS

Figure 1:
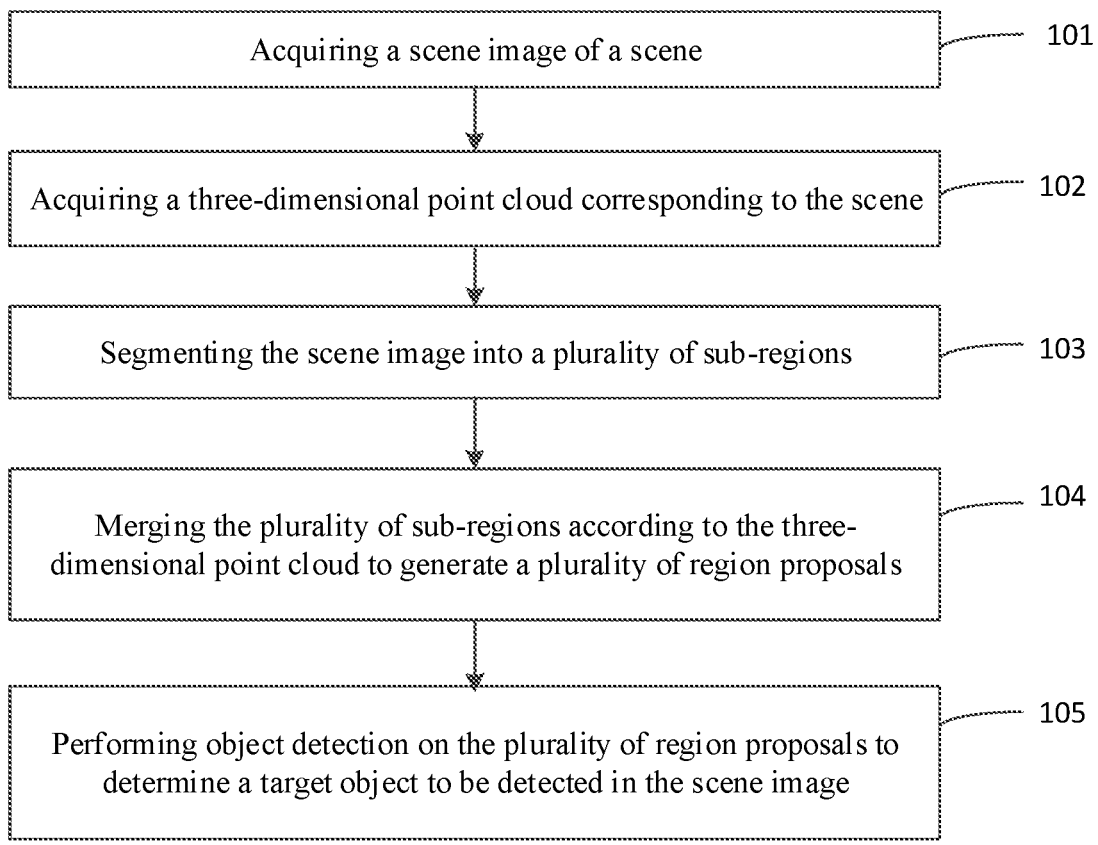
FIG. 1 is a flowchart of an object detection method according to an embodiment of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

Currently, a mainstream object detection method includes two stages. The first stage is to extract a number of regions (i.e., region proposals) that may include objects based on an image by using a region proposal generation method. The second stage is to perform feature extraction on the extracted region proposals, and then identify categories of the objects in the region proposals by a classifier.

In the related art, during object detection, methods such as selective search and deep learning, are usually adopted in the first stage to generate region proposals, which may generate unreasonable redundant region proposals. Therefore, it is easy to cause waste of computing resources and computing time due to redundant region proposals during subsequent feature extraction and the like on the region proposals.

Embodiments of the present disclosure provide an object detection method for the above technical problems. After a scene image of a scene is acquired, a three-dimensional point cloud corresponding to the scene is acquired. The scene image is segmented into a plurality of sub-regions. The plurality of sub-regions is merged according to the three-dimensional point cloud to generate a plurality of region proposals. Object detection is performed on the plurality of region proposals to determine a target object to be detected in the scene image.

With the object detection method according to embodiments of the present disclosure, when performing object detection, after segmenting the scene image into the plurality of sub-regions, the plurality of sub-regions are merged according to the sparse three-dimensional point cloud to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

An object detection method, an object detection device, a terminal device, and a computer readable storage medium are described below with reference to the drawings.

The object detection method according to the embodiments of the present disclosure is specified below in combination with FIG. 1. FIG. 1 is a flowchart of an object detection method according to an embodiment of the present disclosure.

As illustrated in FIG. 1, the object detection method according to the present disclosure may include the following acts.

At block 101, a scene image of a scene is acquired.

In detail, the object detection method according to the present disclosure may be executed by the object detection device according to the present disclosure. The object detection device may be configured in a terminal device to perform object detection on the scene image of the scene. The terminal device according to the embodiments of the present disclosure may be any hardware device capable of data processing, such as a smart phone, a tablet computer, a robot, and a wearable device like a head mounted mobile device.

It is understood that a camera can be configured in the terminal device to take the scene image of the scene.

The scene may be a physical scene or a virtual scene, which is not limited herein. The scene image may be static or dynamic, which is not limited herein.

At block 102, a three-dimensional point cloud corresponding to the scene is acquired.

In detail, the three-dimensional point cloud corresponding to the scene may be generated by scanning the scene using a simultaneous localization and mapping (SLAM) system, or a dense three-dimensional point cloud corresponding to the scene may be acquired by a depth camera, or the three-dimensional point cloud of the scene may be acquired by other methods, which is not limited herein.

At block 103, the scene image is segmented into a plurality of sub-regions.

Each sub-region belongs to one object at most. The sub-region may include a single pixel or a plurality of pixels, and a size and shape of the sub-region may be arbitrarily set as needed, which is not limited herein.

In detail, the scene image may be segmented by any method, such as a watershed segmentation algorithm, a pyramid segmentation algorithm, and a mean shift segmentation algorithm, which is not limited herein.

In addition, the acts at blocks 102 and 103 may be performed simultaneously, or the act at block 102 may be performed first and then the act at block 103 may be performed, or the act at block 103 may be performed first, and then the act at block 102 is performed, which is not limited herein. In other words, the acts at blocks 102 and 103 are required to be implemented before the act at block 104.

At block 104, the plurality of sub-regions are merged according to the three-dimensional point cloud to generate a plurality of region proposals.

In detail, the act at block 104 can be implemented by following acts at blocks 104a and 104b.

At block 104a, a first sub-image to a nth sub-image and a first three-dimensional point sub-cloud to a nth three-dimensional point sub-cloud corresponding to a first sub-region to a nth sub-region are acquired, in which n is a positive integer greater than one.

In an implementation, if the scene image is segmented into n sub-regions and labeled as the first sub-region to the nth sub-region, the first sub-image to the nth sub-image corresponding to the first sub-region to the nth sub-region may be acquired according to the scene image. According to the three-dimensional point cloud corresponding to the scene, the first three-dimensional point sub-cloud to the nth three-dimensional point sub-cloud corresponding to the first sub-region to the nth sub-region are acquired. The first sub-image to the nth sub-image correspond to the first three-dimensional point sub-cloud to the nth three-dimensional point sub-cloud.

At block 104b, n sub-regions are merged according to the first sub-image to the nth sub-image and the first three-dimensional point sub-cloud to the nth three-dimensional point sub-cloud to form the plurality of region proposals.

In detail, image similarities among sub-images from the first sub-image to the nth sub-image may be acquired, and three-dimensional point similarities among three-dimensional point sub-clouds from the first three-dimensional point sub-cloud to the nth three-dimensional point sub-cloud may be acquired. The n sub-regions are merged according to the image similarities and the three-dimensional point similarities, which will not be described here.

At block 105, object detection is performed on the plurality of region proposals to determine a target object to be detected in the scene image.

In detail, after forming the plurality of region proposals, feature maps of the plurality of region proposals may be extracted by using a neural network, and then a classification method is adopted to identify the categories of the objects in each region proposal, and then a bounding box of each object is subject to regression, so that the size of each object is determined to realize object detection on the plurality of region proposals, thereby determining the target object to be detected in the scene image.

The neural network for extracting the feature map of the region proposal may be arbitrary feature extraction network. Any image classification neural network can be used to determine the object category. When the bounding box of the object is regressed, any regression neural network can be utilized, which is not limited herein.

It can be understood that, when performing object detection in the embodiments of the present disclosure, after the scene image is segmented into the plurality of sub-regions, the sub-regions are merged both according to the image similarities among the sub-regions and the three-dimensional point similarities among the sub-regions determined by the sparse three-dimensional point cloud of the scene, such that the generated region proposals are more accurate and less in number.

It is understood that the object detection method according to the embodiments of the present disclosure can be applied to an AR software development kit (SDK) to provide an object detection function, and the developer can utilize the object detection function in the AR SDK to realize the identification of objects in the scene, and then realize various functions, such as product recommendation in the e-commerce field.

With the object detection method according to embodiments of the present disclosure, the scene image of the scene is acquired, and the three-dimensional point cloud corresponding to the scene is acquired. The scene image is segmented into the plurality of sub-regions, which are merged according to the three-dimensional point cloud to generate the plurality of region proposals. Finally, object detection is performed on the plurality of region proposals to determine the target object to be detected in the scene image. Therefore, after the scene image is segmented into the plurality of sub-regions during object detection, the plurality of sub-regions are merged by using the three dimensional point cloud of the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

Figure 2:
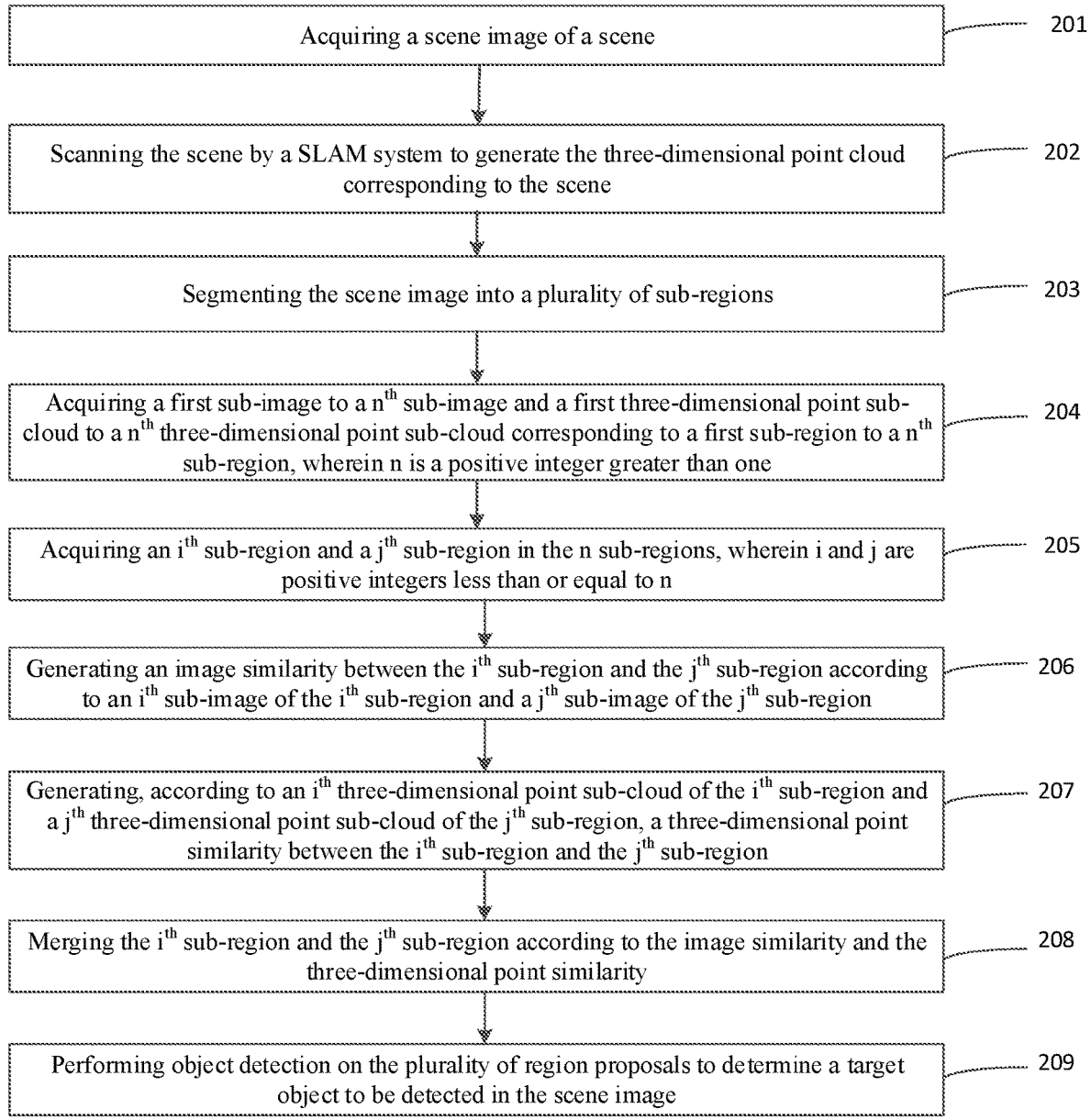
FIG. 2 is a flowchart of an object detection method according to an embodiment of the present disclosure.

The object detection method according to embodiments of the present disclosure is further described below with reference to FIG. 2. FIG. 2 is a flowchart of an object detection method according to another embodiment of the present disclosure.

As illustrated in FIG. 2, the object detection method according to embodiments of the present disclosure may include the following acts.

At block 201, a scene image of a scene is acquired.

At block 202, the scene is scanned by a simultaneous localization and mapping (SLAM) system to generate a three-dimensional point cloud corresponding to the scene.

The SLAM system utilized in the embodiments of the present disclosure will be briefly described below.

The SLAM system, as its name implies, enables both positioning and map construction. When the user holds or wears a terminal device and starts from an unknown location in an unknown environment, the SLAM system in the terminal device estimates position and posture of the camera at each moment through feature points observed by the camera during the motion, and merges image frames acquired at different moments by the camera to reconstruct into a complete three-dimensional map of the scene around the user. The SLAM system is widely used in robot positioning navigation, virtual reality (VR), augmented reality (AR), drone, and unmanned driving. The position and posture of the camera at each moment can be represented by a matrix or vector containing rotation and translation information.

The SLAM systems can be generally divided into visual front-end module and optimized back-end module.

The main tasks of the visual front-end are solving the camera pose transformation between adjacent frames by using the image frames acquired by the camera at different moments during motion and through the feature matching, and completing the fusion of the image frames to reconstruct a map.

The visual front-end relies on sensors installed in terminal devices such as robots or smart phones. Common sensors include cameras (such as monocular cameras, binocular cameras, TOF cameras), inertial measurement units (IMUs), and laser radars, and are configured to collect various types of raw data in the actual environment, including laser scanning data, video image data, and point cloud data.

The SLAM system's optimized back-end is mainly to optimize and fine-tune the inaccurate camera pose and reconstruction map obtained by the visual front-end, which can be separated from the visual front-end as an offline operation or integrated into the visual front-end.

In an implementation, the SLAM system can be used to obtain the three-dimensional point cloud corresponding to the scene by using the following manners.

In detail, the camera included in the terminal device may be calibrated in advance to determine internal parameters of the camera, and then the scene is scanned using the calibrated camera, and the three-dimensional point cloud corresponding to the scene is generated by using the SLAM system.

To calibrate the camera, it can first print a 7*9 black and white calibration board on a A4 paper, and the size of the checkerboard on the calibration board is measured as 29.1 mm. The calibration board is posted on a neat and flat wall, and a video is shot against the calibration board using the camera to be calibrated. During the shooting, the camera is continuously moved to shoot the calibration board from different angles and at different distances. The calibration program is written using OpenCV packaged algorithms and functions. Finally, the video is converted into images, and 50 of the images are selected as calibration images together with the basic parameters of the calibration board to be input into the calibration program, and then the internal parameters of the camera can be calculated.

A point in a world coordinate system is measured in terms of physical dimensions, and a point in an image plane is measured in pixels. The internal parameters are used to make a linear change between the two coordinate systems. A point Q (X, Y, Z) in a space can be transformed by the internal parameter matrix to obtain the corresponding point q (u, v) of the point projected by the ray onto the pixel coordinate system on the image plane, in which:

$$Z\begin{bmatrix}u\\v\\1\end{bmatrix}=K\begin{bmatrix}X\\Y\\Z\end{bmatrix}.$$

K is the internal parameter matrix of the camera.

$$K = \begin{bmatrix} \frac{f}{dx} & 0 & u_0 \\ 0 & \frac{f}{dy} & 0 \\ 0 & 0 & 1 \end{bmatrix},$$

where, f is a focal length of the camera in units of millimeters, dx and dy are a length and a width of each pixel in units of millimeters, $u_0$, $v_0$ are coordinates of a center of the image usually in units of pixels.

According to the internal parameters of the camera and the height and width of the scene image obtained when the camera is shooting the scene, a camera parameter file is written according to the format required by a DSO program, and the camera parameter file is used as an input to start the DSO program. In other words, the three-dimensional point cloud of the scene can be constructed in real time when the camera is used to scan the scene.

It should be noted that the foregoing method is only an implementation manner of scanning the scene by the SLAM system to generate the three-dimensional point cloud corresponding to the scene. In an actual application, the SLAM system may be used to generate the three-dimensional point cloud corresponding to the scene by using any other method, which is not limited therein.

In addition, in the foregoing embodiments, the SLAM system is used to scan the scene to generate the three-dimensional point cloud corresponding to the scene. In an actual application, a dense three-dimensional point cloud corresponding to the scene may be acquired by a depth camera, or the three-dimensional point cloud of the scene may be acquired by using other methods, which is not limited therein.

At block 203, the scene image is segmented into a plurality of sub-regions.

At block 204, a first sub-image to a $n^{th}$ sub-image and a first three-dimensional point sub-cloud to a $n^{th}$ three-dimensional point sub-cloud corresponding to a first sub-region to a $n^{th}$ sub-region, are acquired, in which n is a positive integer greater than one.

At block 205, an $i^{th}$ sub-region and a $i^{th}$ sub-region in the n sub-regions are acquired, in which i and j are positive integers less than or equal to n.

The implementation process and principle of the acts at blocks 201-205 refer to the description of the above embodiment, which is not repeated here.

At block 206, an image similarity between the $i^{th}$ sub-region and the $j^{th}$ sub-region is generated according to an $i^{th}$ sub-image of the $i^{th}$ sub-region and a $j^{th}$ sub-image of the $j^{th}$ sub-region.

In detail, a structural similarity (SSIM), a cosine similarity, mutual information, a color similarity, or a histogram similarity between the $i^{th}$ sub-image of the $i^{th}$ sub-region and the $j^{th}$ sub-image of the $j^{th}$ sub-region may be calculated, to generate the image similarity between the $i^{th}$ sub-region and the $j^{th}$ sub-region.

At block 207, a three-dimensional point similarity between the $i^{th}$ sub-region and the $j^{th}$ sub-region is generated according to an $i^{th}$ three-dimensional point sub-cloud of the $i^{th}$ sub-region and a $j^{th}$ three-dimensional point sub-cloud of the $j^{th}$ sub-region.

In detail, the three-dimensional point similarity between the $i^{th}$ sub-region and the $j^{th}$ sub-region can be determined by calculating a distance between each three-dimensional point in the $i^{th}$ three-dimensional point sub-cloud of the $i^{th}$ sub-region and each three-dimensional point in $j^{th}$ three-dimensional point sub-cloud of the $j^{th}$ sub-region.

It can be understood that there may be a plurality of three-dimensional points in the $i^{th}$ three-dimensional point sub-cloud and in the $j^{th}$ three-dimensional point sub-cloud. Correspondingly, there are a plurality of distance parameters among the three-dimensional points in the $i^{th}$ three-dimensional point sub-cloud and the three-dimensional points in the $j^{th}$ three-dimensional point sub-cloud. In the embodiments of the present disclosure, according to the maximum distance between the three-dimensional point in the $i^{th}$ three-dimensional point sub-cloud and the three-dimensional point in the $j^{th}$ three-dimensional point sub-cloud, or the average value of the distances among the three-dimensional points in the $i^{th}$ three-dimensional point sub-cloud and the three-dimensional points in the $j^{th}$ three-dimensional point sub-cloud, the three-dimensional point similarity between the $i^{th}$ sub-region and the $j^{th}$ sub-region is generated.

In the implementation, a correspondence between distances among the three-dimensional points and three-dimensional point similarities may be preset in advance, such that according to the maximum distance between the three-dimensional point in the $i^{th}$ three-dimensional point sub-cloud and the three-dimensional point in the $j^{th}$ three-dimensional point sub-cloud, or the average value of the distances among the three-dimensional points in the $i^{th}$ three-dimensional point sub-cloud and the three-dimensional points in the $j^{th}$ three-dimensional point sub-cloud, the three-dimensional point similarity between the $j^{th}$ sub-region and the $j^{th}$ sub-region is generated. The distances among the three-dimensional points and the three-dimensional point similarities may be inversely proportional, that is, the greater the distance, the smaller the three-dimensional point similarity.

Alternatively, each three-dimensional point in the $i^{th}$ three-dimensional point sub-cloud of the $i^{th}$ sub-region and each three-dimensional point in the $j^{th}$ three-dimensional point sub-cloud of the $j^{th}$ sub-region are fitted to the preset model, to calculate the distance between the preset models fitted to each three-dimensional point in different three-dimensional point sub-clouds to generate the three-dimensional point similarity between the $i^{th}$ sub-region and the $j^{th}$ sub-region.

In detail, a correspondence between distances among the preset models and three-dimensional point similarities may be preset. Each three-dimensional point in the $i^{th}$ three-dimensional point sub-cloud of the $i^{th}$ sub-region is fitted with a first preset model, and each three-dimensional point in the $j^{th}$ three-dimensional point sub-cloud of the $j^{th}$ sub-region is fitted with a second preset model, and then the distance between the first preset model and the second preset model is determined. According to the correspondence between distances among the preset models and three-dimensional point similarities, the three-dimensional point similarity between the $i^{th}$ sub-region and the $j^{th}$ sub-region is determined.

The preset model may be a preset geometric basic model, such as a sphere, a cylinder, a plane, and an ellipsoid, or a complex geometric model composed of geometric basic models, or other preset models, which is not limited herein.

In addition, the manner of fitting the three-dimensional points in the three-dimensional point sub-cloud to the preset model may be a least square method or any other manner, which is not limited herein.

For example, by fitting the three-dimensional points in the $i^{th}$ three-dimensional point sub-cloud to the cylinder, the cylinder is parameterized, for example, the cylinder in a space can be represented by parameters such as a center coordinate (X, Y, Z), a bottom radius, a height, and an orientation in three-dimensional space, and then several three-dimensional points are randomly selected from the three-dimensional point sub-cloud by using RANdom SAmple Consensus (RANSAC) algorithm each time. Assuming that these three-dimensional points are in the cylinder, the parameters of the cylinder is calculated, and then the number of three-dimensional points in the three-dimensional point sub-cloud, which are on the cylinder, is counted, and whether the number exceeds a preset number threshold is determined. If not exceeded, another several three-dimensional points are randomly selected to repeat the process, otherwise, it can be determined that the three-dimensional points on the cylinder in the three-dimensional point sub-cloud can be fitted with the cylinder, such that the cylinder fitted with each three-dimensional point in the $i^{th}$ three-dimensional point sub-cloud may be acquired. Then through a similar algorithm, a second preset model fitted to each three-dimensional point in the $j^{th}$ three-dimensional point sub-cloud is obtained, and it is assumed that the second preset model is an ellipse. Then, the distance between the cylinder and the ellipse can be calculated, and the three-dimensional point similarity between the $i^{th}$ sub-region and the $j^{th}$ sub-region is determined according to the correspondence between distances and three-dimensional point similarities.

The number threshold can be set as needed, which is not limited herein.

In addition, a distance threshold can be set and the distances of all three-dimensional points in the three-dimensional point sub-cloud to the cylinder can be calculated, thereby determining a three-dimensional point whose distance is less than the distance threshold as a three-dimensional point on the cylinder.

At block 208, the $i^{th}$ sub-region and the $j^{th}$ sub-region are merged according to the image similarity and the three-dimensional point similarity.

In detail, an image similarity threshold and a three-dimensional point similarity threshold may be preset, so that after determining the image similarity and the three-dimensional point similarity between the $i^{th}$ sub-region and the $j^{th}$ sub-region, the image similarity and the image similarity threshold are compared and the three-dimensional point similarity and the three-dimensional point similarity threshold are compared. If the image similarity is greater than the image similarity threshold, and the three-dimensional point similarity is greater than the three-dimensional point similarity threshold, it may be determined that the $i^{th}$ sub-image of the $i^{th}$ sub-region and the $j^{th}$ sub-image of the $j^{th}$ sub-region are images of different parts of the same object and can be used as one region proposal, so that the $i^{th}$ sub-region and the $j^{th}$ sub-region can be merged.

In addition, if the image similarity between the $i^{th}$ sub-region and the $j^{th}$ sub-region is less than or equal to the image similarity threshold, or the three-dimensional point similarity between the $i^{th}$ sub-region and the $j^{th}$ sub-region is less than or equal to the three-dimensional point similarity threshold, it may be determined that the $i^{th}$ sub-image of the $i^{th}$ sub-region and the $j^{th}$ sub-image of the $j^{th}$ sub-region are images of different objects, so that the $i^{th}$ sub-region and the $j^{th}$ sub-region cannot be merged.

Figure 3:
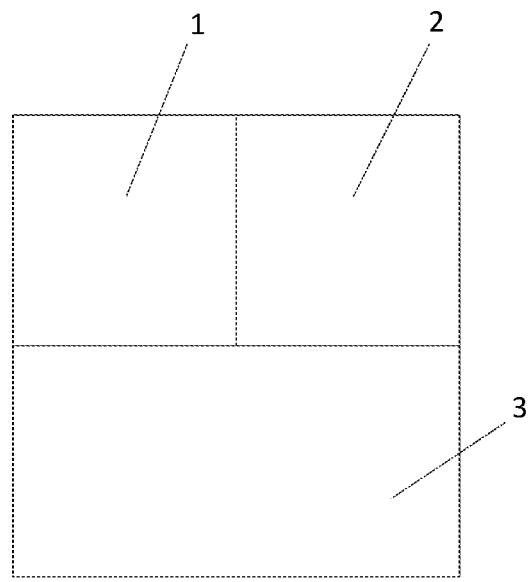
FIG. 3 is a schematic diagram of a method of merging sub-regions according to an embodiment of the present disclosure.

For example, assuming that the image similarity threshold is 80% and the three-dimensional point similarity threshold is 70%. FIG. 3 is partial sub-regions after segmenting the scene image into the plurality of sub-regions. The image similarity between a region 1 and a region 2 is 90%, and the three-dimensional point similarity between the region 1 and the region 2 is 80%. The image similarity between the region 1 and other regions is less than 80%, and the three-dimensional point similarity between the region 1 and other regions is less than 70%. The image similarity between the region 2 and other regions is less than 80%, and the three-dimensional point similarity between the region 2 and other regions is less than 70%. The image similarity between the region 3 and other regions is less than 80%, and the three-dimensional point similarity between the region 3 and other regions is less than 70%. The region 1 and the region 2 are merged to form one region proposal. The region 2 and the region 3 are determined as separate region proposals.

At block 209, object detection is performed on the plurality of region proposals to determine a target object to be detected in the scene image.

In detail, after forming the plurality of region proposals, feature maps of the plurality of region proposals may be extracted by using a neural network, and then a classification method is used to identify the categories of the objects in each region proposal, and then a bounding box of each object is regressed. The size of each object is determined to achieve object detection on the plurality of region proposals, thereby determining the target object to be detected in the scene image.

The neural network for extracting the feature map of the region proposal may be arbitrary feature extraction network. Any image classification neural network can be used to determine the object category. When the bounding box of the object is regressed, any regression neural network can be utilized, which is not limited herein.

When performing object detection in the embodiments of the present disclosure, after the scene image is segmented into the plurality of sub-regions, three-dimensional point similarities among the sub-regions and the image similarities among the sub-regions may be generated according to the sparse three-dimensional point cloud, and the sub-regions are merged according to the similarities to generate the plurality of region proposals and further determine the target object to be detected in the scene image, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

Figure 4:
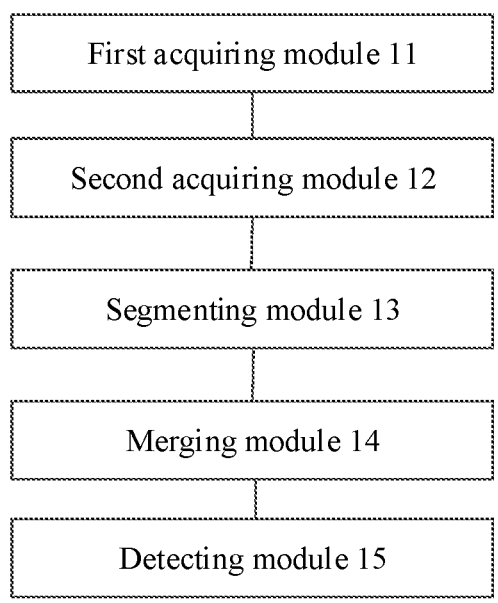
FIG. 4 is a block diagram of an object detection device according to an embodiment of the present disclosure.

The object detection device according to embodiments of the present disclosure is described below in combination with FIG. 4. FIG. 4 is a block diagram of an object detection device according to an embodiment of the present disclosure.

As illustrated in FIG. 4, the object detection device includes a first acquiring module 11, a second acquiring module 12, a segmenting module 13, a merging module 14, and a detecting module 15.

The first acquiring module 11 is configured to acquire a scene image of a scene.

The second acquiring module 12 is configured to acquire a three-dimensional point cloud corresponding to the scene.

The segmenting module 13 is configured to segment the scene image into a plurality of sub-regions.

The merging module 14 is configured to merge the plurality of sub-regions according to the three-dimensional point cloud to generate a plurality of region proposals.

The detecting module 15 is configured to perform object detection on the plurality of region proposals to determine a target object to be detected in the scene image.

In an exemplary embodiment, the second acquiring module 12 is configured to scan the scene by a simultaneous localization and mapping (SLAM) system to generate the three-dimensional point cloud corresponding to the scene.

In detail, the object detection device can perform the object detection method described in the foregoing embodiments. The device may be configured in the terminal device to perform object detection on the scene image of the scene. The terminal device in the embodiments of the present disclosure may be any hardware device capable of data processing, such as a smart phone, a tablet computer, a robot, a wearable device such as a head mounted mobile device.

It should be noted that the implementation process and technical principle of the object detection device in this embodiment refer to the foregoing illustration of the object detection method in the embodiments of the first aspect, and details are not described herein again.

With the object detection device according to embodiments of the present disclosure, the scene image of the scene is acquired, and the three-dimensional point cloud corresponding to the scene is acquired. The scene image is segmented into the plurality of sub-regions, which are merged according to the three-dimensional point cloud to generate the plurality of region proposals. Finally, object detection is performed on the plurality of region proposals to determine the target object to be detected in the scene image. Therefore, after the scene image is segmented into the plurality of sub-regions during object detection, the plurality of sub-regions are merged by using the three dimensional point cloud of the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

Figure 5:
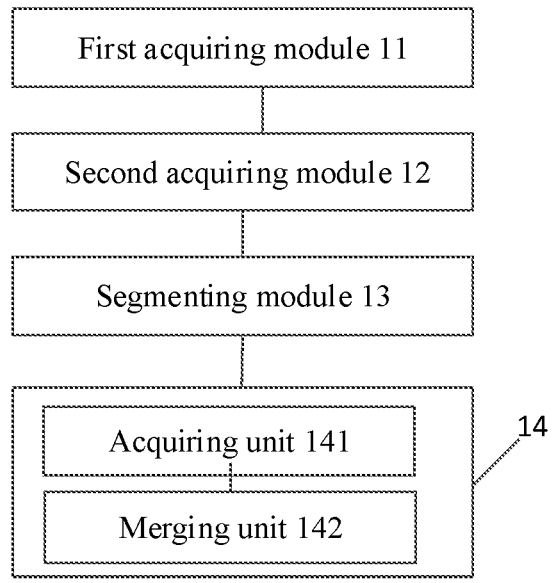
FIG. 5 is a block diagram of an object detection device according to an embodiment of the present disclosure.

The object detection device according to embodiments of the present disclosure is further described below in combination with FIG. 5. FIG. 5 is a block diagram of an object detection device according to another embodiment of the present disclosure.

As illustrated in FIG. 5, on the basis of FIG. 4, the merging module 14 includes: an acquiring unit 141 and a merging unit 142.

The acquiring unit 141 is configured to acquire a first sub-image to a $n^{th}$ sub-image and a first three-dimensional point sub-cloud to a $n^{th}$ three-dimensional point sub-cloud corresponding to a first sub-region to a $n^{th}$ sub-region, wherein n is a positive integer greater than one.

The merging unit 142 is configured to merge n sub-regions according to the first sub-image to the $n^{th}$ sub-image and the first three-dimensional point sub-cloud to the $n^{th}$ three-dimensional point sub-cloud to form the plurality of region proposals.

In an exemplary embodiment, the merging unit 142 is configured to: acquire an $i^{th}$ sub-region and a $j^{th}$ sub-region in the n sub-regions, wherein i and j are positive integers less than or equal to n; generate an image similarity between the $i^{th}$ sub-region and the $j^{th}$ sub-region according to an $i^{th}$ sub-image of the $i^{th}$ sub-region and a $j^{th}$ sub-image of the $j^{th}$ sub-region; generate, according to an $i^{th}$ three-dimensional point sub-cloud of the $i^{th}$ sub-region and a $j^{th}$ three-dimensional point sub-cloud of the $j^{th}$ sub-region, a three-dimensional point similarity between the $i^{th}$ sub-region and the $j^{th}$ sub-region; and merge the $i^{th}$ sub-region and the $j^{th}$ sub-region according to the image similarity and the three-dimensional point similarity.

In an exemplary embodiment, the merging unit 142 is configured to merge the $i^{th}$ sub-region and the $j^{th}$ sub-region, when the image similarity is greater than an image similarity threshold, and the three-dimensional point similarity is greater than a three-dimensional point similarity threshold.

It should be noted that the implementation process and technical principle of the object detection device in this embodiment refer to the foregoing illustration of the object detection method in the embodiments of the first aspect, and details are not described herein again.

With the object detection device according to embodiments of the present disclosure, the scene image of the scene is acquired, and the three-dimensional point cloud corresponding to the scene is acquired. The scene image is segmented into the plurality of sub-regions, which are merged according to the three-dimensional point cloud to generate the plurality of region proposals. Finally, object detection is performed on the plurality of region proposals to determine the target object to be detected in the scene image. Therefore, after the scene image is segmented into the plurality of sub-regions during object detection, the plurality of sub-regions are merged by using the three dimensional point cloud of the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

In order to realize the above embodiment, the present disclosure further provides a terminal device.

Figure 6:
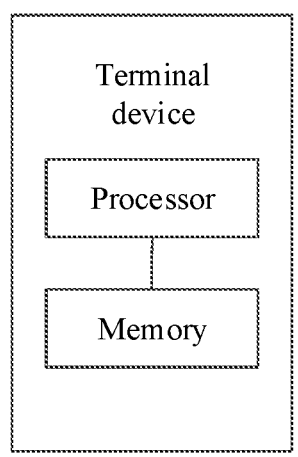
FIG. 6 is a block diagram of a terminal device according to an embodiment of the present disclosure.

FIG. 6 is a block diagram of a terminal device according to an embodiment of the present disclosure.

As illustrated in FIG. 6, the terminal device, includes: a memory, a processor, and computer programs stored in the memory and executable by the processor. When the processor executes the computer programs, the object detection method according to embodiments of the first aspect is implemented.

It should be noted that the implementation process and technical principle of the terminal device in this embodiment refer to the foregoing illustration of the object detection method in the embodiments of the first aspect, and details are not described herein again.

With the terminal device according to embodiments of the present disclosure, the scene image of the scene is acquired, and the three-dimensional point cloud corresponding to the scene is acquired. The scene image is segmented into the plurality of sub-regions, which are merged according to the three-dimensional point cloud to generate the plurality of region proposals. Finally, object detection is performed on the plurality of region proposals to determine the target object to be detected in the scene image. Therefore, after the scene image is segmented into the plurality of sub-regions during object detection, the plurality of sub-regions are merged by using the three dimensional point cloud of the scene to generate the plurality of region proposals, such that the generated region proposals are more accurate, and the number of the generated region proposals is greatly reduced. Since the number of the generated region proposals is reduced, the computing time is reduced and less computing resource is consumed for subsequent feature extraction and the like on the region proposals, thereby saving the computing time and computing resource for object detection, and improving the efficiency of object detection.

In order to realize the above embodiment, the present disclosure further provides a computer readable storage medium, storing computer programs therein. When the computer programs are executed by a processor, the object detection method according to embodiments of the first aspect is implemented.

In order to realize the above embodiment, the present disclosure further provides computer programs. When the computer programs are executed by a processor, the object detection method according to embodiments is implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure.

In addition, terms such as "first" and "second" are used herein for purposes of description and are not intended to indicate or imply relative importance or significance. Thus, the feature defined with "first" and "second" may comprise one or more this feature.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. An object detection method, comprising:
acquiring a scene image of a scene;
acquiring a three-dimensional point cloud corresponding to the scene;
segmenting the scene image into a plurality of sub-regions;
merging the plurality of sub-regions according to image similarities among the sub-regions and three-dimensional point similarities among the sub-regions to generate a plurality of region proposals, wherein a three-dimensional point similarity between any two sub-regions is determined by calculating distances between three-dimensional points in a three-dimensional point sub-cloud corresponding to one of said two sub-regions and three-dimensional points in a three-dimensional point sub-cloud corresponding to another of said two sub-regions, and the three-dimensional point similarity is inversely proportional to the calculated distances; wherein when the image similarity of the two sub-regions is greater than an image similarity threshold, and the three-dimensional point similarity of the two sub-regions is greater than a three-dimensional point similarity threshold, merging the two sub-regions; and
performing object detection on the plurality of region proposals to determine a target object to be detected in the scene image.

2. The method of claim 1, wherein acquiring the three-dimensional point cloud corresponding to the scene, comprises:
scanning the scene by a simultaneous localization and mapping (SLAM) system to generate the three-dimensional point cloud corresponding to the scene.

3. The method of claim 1, wherein merging the plurality of sub-regions according to image similarities among the sub-regions and three-dimensional point similarities among the sub-regions to generate the plurality of region proposals, comprises:
acquiring a first sub-image to a $n^{th}$ sub-image of the scene image and a first three-dimensional point sub-cloud to a $n^{th}$ three-dimensional point sub-cloud of the three-dimensional point cloud corresponding to a first sub-region to a $n^{th}$ sub-region, wherein n is a positive integer greater than one; and
merging n sub-regions according to the first sub-image to the $n^{th}$ sub-image and the first three-dimensional point sub-cloud to the $n^{th}$ three-dimensional point sub-cloud to form the plurality of region proposals.

4. The method of claim 3, wherein merging the n sub-regions according to the first sub-image to the nth sub-image and the first three-dimensional point sub-cloud to the nth three-dimensional point sub-cloud to form the plurality of region proposals, comprises:
acquiring an $i^{th}$ sub-region and a $j^{th}$ sub-region in the n sub-regions, wherein i and j are positive integers less than or equal to n;
generating an image similarity between the $i^{th}$ sub-region and the $j^{th}$ sub-region according to an $i^{th}$ sub-image of the $i^{th}$ sub-region and a $j^{th}$ sub-image of the $j^{th}$ sub-region;
generating, according to an $i^{th}$ three-dimensional point sub-cloud of the $i^{th}$ sub-region and a $j^{th}$ three-dimensional point sub-cloud of the $j^{th}$ sub-region, a three-dimensional point similarity between the $i^{th}$ sub-region and the $j^{th}$ sub-region; and merging the $i^{th}$ sub-region and the $j^{th}$ sub-region according to the image similarity and the three-dimensional point similarity.

5. The method of claim 4, wherein said generating an image similarity between the $i^{th}$ sub-region and the $j^{th}$ sub-region according to an $i^{th}$ sub-image of the $i^{th}$ sub-region and a $j^{th}$ sub-image of the $j^{th}$ sub-region comprises:

calculating a structural similarity, a cosine similarity, mutual information, a color similarity, or a histogram similarity between the $i^{th}$ sub-image of the $i^{th}$ sub-region and the $j^{th}$ sub-image of the $j^{th}$ sub-region to generate the image similarity between the $i^{th}$ sub-region and the $j^{th}$ sub-region.

6. The method of claim 4, wherein said generating, according to an $i^{th}$ three-dimensional point sub-cloud of the $i^{th}$ sub-region and a $j^{th}$ three-dimensional point sub-cloud of the $j^{th}$ sub-region, a three-dimensional point similarity between the $i^{th}$ sub-region and the $j^{th}$ sub-region comprises:

calculating a distance between each three-dimensional point in the $i^{th}$ three-dimensional point sub-cloud of the $i^{th}$ sub-region and each three-dimensional point in $j^{th}$ three-dimensional point sub-cloud of the $j^{th}$ sub-region to determine the three-dimensional point similarity between the $i^{th}$ sub-region and the $j^{th}$ sub-region.

7. The method of claim 1, wherein the scene image is segmented by one of a watershed segmentation algorithm, a pyramid segmentation algorithm, and a mean shift segmentation algorithm.

8. A terminal device, comprising: a memory, a processor, and computer programs stored in the memory and executable by the processor, wherein when the processor executes the computer programs, an object detection method is implemented, the object detection method comprising:

acquiring a scene image of a scene;

acquiring a three-dimensional point cloud corresponding to the scene;

segmenting the scene image into a plurality of sub-regions;

merging the plurality of sub-regions according to image similarities among the sub-regions and three-dimensional point similarities among the sub-regions to generate a plurality of region proposals, wherein a three-dimensional point similarity between any two sub-regions is determined by calculating distances between three-dimensional points in a three-dimensional point sub-cloud corresponding to one of said two sub-regions and three-dimensional points in a three-dimensional point sub-cloud corresponding to another of said two sub-regions, and the three-dimensional point similarity is inversely proportional to the calculated distances; wherein when the image similarity of the two sub-regions is greater than an image similarity threshold, and the three-dimensional point similarity of the two sub-regions is greater than a three-dimensional point similarity threshold, merging the two sub-regions; and performing object detection on the plurality of region proposals to determine a target object to be detected in the scene image.

9. The terminal device according to claim 8, wherein acquiring the three-dimensional point cloud corresponding to the scene, comprises:

scanning the scene by a simultaneous localization and mapping (SLAM) system to generate the three-dimensional point cloud corresponding to the scene.

10. The terminal device according to claim 8, wherein merging the plurality of sub-regions according to image similarities among the sub-regions and three-dimensional point similarities among the sub-regions to generate the plurality of region proposals, comprises:

acquiring a first sub-image to a $n^{th}$ sub-image of the scene image and a first three-dimensional point sub-cloud to a $n^{th}$ three-dimensional point sub-cloud of the three-dimensional point cloud corresponding to a first sub-region to a $n^{th}$ sub-region, wherein n is a positive integer greater than one; and merging n sub-regions according to the first sub-image to the $n^{th}$ sub-image and the first three-dimensional point sub-cloud to the $n^{th}$ three-dimensional point sub-cloud to form the plurality of region proposals.

11. The terminal device according to claim 10, wherein merging the n sub-regions according to the first sub-image to the nth sub-image and the first three-dimensional point sub-cloud to the nth three-dimensional point sub-cloud to form the plurality of region proposals, comprises:

acquiring an $i^{th}$ sub-region and a $j^{th}$ sub-region in the n sub-regions, wherein i and j are positive integers less than or equal to n;

generating an image similarity between the $i^{th}$ sub-region and the $j^{th}$ sub-region according to an $i^{th}$ sub-image of the $i^{th}$ sub-region and a $j^{th}$ sub-image of the $j^{th}$ sub-region;

generating, according to an $i^{th}$ three-dimensional point sub-cloud of the $i^{th}$ sub-region and a $j^{th}$ three-dimensional point sub-cloud of the $j^{th}$ sub-region, a three-dimensional point similarity between the $i^{th}$ sub-region and the $j^{th}$ sub-region; and merging the $i^{th}$ sub-region and the $j^{th}$ sub-region according to the image similarity and the three-dimensional point similarity.

12. The terminal device of claim 11, wherein said generating an image similarity between the $i^{th}$ sub-region and the $j^{th}$ sub-region according to an $i^{th}$ sub-image of the $i^{th}$ sub-region and a $j^{th}$ sub-image of the $j^{th}$ sub-region comprises:

calculating a structural similarity, a cosine similarity, mutual information, a color similarity, or a histogram similarity between the $i^{th}$ sub-image of the $i^{th}$ sub-region and the $j^{th}$ sub-image of the $j^{th}$ sub-region to generate the image similarity between the $i^{th}$ sub-region and the $j^{th}$ sub-region.

13. The terminal device of claim 11, wherein said generating, according to an $i^{th}$ three-dimensional point sub-cloud of the $i^{th}$ sub-region and a $j^{th}$ three-dimensional point sub-cloud of the $j^{th}$ sub-region, a three-dimensional point similarity between the $i^{th}$ sub-region and the $j^{th}$ sub-region comprises:

calculating a distance between each three-dimensional point in the $i^{th}$ three-dimensional point sub-cloud of the $i^{th}$ sub-region and each three-dimensional point in $j^{th}$ three-dimensional point sub-cloud of the $j^{th}$ sub-region to determine the three-dimensional point similarity between the $i^{th}$ sub-region and the $j^{th}$ sub-region.

14. A non-transitory computer readable storage medium, storing computer programs therein, wherein when the computer programs are executed by a processor, an object detection method is implemented, the object detection method comprising:

acquiring a scene image of a scene;

acquiring a three-dimensional point cloud corresponding to the scene;
segmenting the scene image into a plurality of sub-regions;
merging the plurality of sub-regions according to image similarities among the sub-regions and three-dimensional point similarities among the sub-regions to generate a plurality of region proposals, wherein a three-dimensional point similarity between any two sub-regions is determined by calculating distances between three-dimensional points in a three-dimensional point sub-cloud corresponding to one of said two sub-regions and three-dimensional points in a three-dimensional point sub-cloud corresponding to another of said two sub-regions, and the three-dimensional point similarity is inversely proportional to the calculated distances; wherein when the image similarity of the two sub-regions is greater than an image similarity threshold, and the three-dimensional point similarity of the two sub-regions is greater than a three-dimensional point similarity threshold, merging the two sub-regions; and
performing object detection on the plurality of region proposals to determine a target object to be detected in the scene image.

15. The non-transitory computer readable storage medium according to claim 14, wherein acquiring the three-dimensional point cloud corresponding to the scene, comprises:
scanning the scene by a simultaneous localization and mapping (SLAM) system to generate the three-dimensional point cloud corresponding to the scene.

16. The non-transitory computer readable storage medium according to claim 14, wherein merging the plurality of sub-regions according to image similarities among the sub-regions and three-dimensional point similarities among the sub-regions to generate the plurality of region proposals, comprises:
acquiring a first sub-image to a $n^{th}$ sub-image of the scene image and a first three-dimensional point sub-cloud to a $n^{th}$ three-dimensional point sub-cloud of the three-dimensional point cloud corresponding to a first sub-region to a $n^{th}$ sub-region, wherein n is a positive integer greater than one; and
merging n sub-regions according to the first sub-image to the $n^{th}$ sub-image and the first three-dimensional point sub-cloud to the $n^{th}$ three-dimensional point sub-cloud to form the plurality of region proposals.

17. The non-transitory computer readable storage medium according to claim 16, wherein merging the n sub-regions according to the first sub-image to the nth sub-image and the first three-dimensional point sub-cloud to the nth three-dimensional point sub-cloud to form the plurality of region proposals, comprises:
acquiring an $i^{th}$ sub-region and a $j^{th}$ sub-region in the n sub-regions, wherein i and j are positive integers less than or equal to n;
generating an image similarity between the $i^{th}$ sub-region and the $j^{th}$ sub-region according to an $i^{th}$ sub-image of the $i^{th}$ sub-region and a $j^{th}$ sub-image of the $j^{th}$ sub-region;
generating, according to an $i^{th}$ three-dimensional point sub-cloud of the $i^{th}$ sub-region and a $j^{th}$ three-dimensional point sub-cloud of the $j^{th}$ sub-region, a three-dimensional point similarity between the $i^{th}$ sub-region and the $j^{th}$ sub-region; and
merging the $i^{th}$ sub-region and the $j^{th}$ sub-region according to the image similarity and the three-dimensional point similarity.

* * * * *